(12) United States Patent
Kogan

(10) Patent No.: US 11,169,667 B2
(45) Date of Patent: Nov. 9, 2021

(54) PROFILE PICTURE MANAGEMENT TOOL ON SOCIAL MEDIA PLATFORM

(71) Applicant: INTERNATIONAL BUSINESS MACHINES CORPORATION, Armonk, NY (US)

(72) Inventor: Sandra L. Kogan, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 15/826,852

(22) Filed: Nov. 30, 2017

(65) Prior Publication Data

US 2019/0163333 A1 May 30, 2019

(51) Int. Cl.
*G06F 3/0484* (2013.01)
*G06F 3/0482* (2013.01)
*H04L 29/08* (2006.01)
*H04L 12/58* (2006.01)

(52) U.S. Cl.
CPC .......... *G06F 3/0484* (2013.01); *G06F 3/0482* (2013.01); *H04L 67/306* (2013.01)

(58) Field of Classification Search
CPC ...... G06Q 50/01; G06F 3/0484; H04N 7/157; H04L 51/04; H04L 51/32; H04L 51/063
See application file for complete search history.

(56) References Cited

U.S. PATENT DOCUMENTS

| | | | |
|---|---|---|---|
| 9,741,147 B2* | 8/2017 | Allen | G06T 13/40 |
| 2005/0223328 A1* | 10/2005 | Ashtekar | H04N 21/235 |
| | | | 715/706 |
| 2012/0226706 A1* | 9/2012 | Choi | G06F 16/68 |
| | | | 707/752 |
| 2013/0018957 A1 | 1/2013 | Parnaby et al. | |
| 2014/0089816 A1 | 5/2014 | DiPersia et al. | |
| 2014/0157153 A1* | 6/2014 | Yuen | A63F 13/537 |
| | | | 715/758 |
| 2015/0052462 A1 | 2/2015 | Kulkarni | |

(Continued)

FOREIGN PATENT DOCUMENTS

WO 2016092383 A1 6/2016

OTHER PUBLICATIONS

Doerrfeld, "20+ Emotion Recognition APIs That Will Leave You Impressed, and Concerned", http://nordicapis.com/20-emotion-recognition-apis-that-will-leave-you-impressed-and-concerned/, Dec. 31, 2015, pp. 1-20, printed Feb. 2, 2017.

(Continued)

*Primary Examiner* — Nhat Huy T Nguyen
(74) *Attorney, Agent, or Firm* — Anthony M. Pallone

(57) ABSTRACT

Sentiment-aware management of profile pictures on social media platforms. Embodiments of the invention provide for changing a profile picture of a user of a social network platform. A user submits content for posting to the social network platform. Analysis of electronic text associated with the user post is performed to identify a post sentiment. If the post sentiment differs from a sentiment associated with the profile picture, a candidate replacement profile picture having an associated sentiment that matches the post sentiment more closely relative to the associated sentiment of the profile picture, is identified. The profile picture may be replaced by the candidate profile picture.

20 Claims, 3 Drawing Sheets

(56) References Cited

U.S. PATENT DOCUMENTS

2015/0222586 A1    8/2015  Ebersman et al.
2015/0350125 A1*  12/2015  Henderson ............ H04L 51/043
                                                         715/753

OTHER PUBLICATIONS

Judy, "Profile Pictures for Facebook Will Automatically Change", WebNalyzer, https://webnalyzer.com/profile-pictures-for-facebook-will-automatically-change/, Sep. 2015, pp. 1-4, printed Feb. 2, 2017.

Marketsandmarkets.com "Facial Recognition Market by Component: Software Tools (2D, 3D, and Thermal) and Services (Training & Consulting Services and Cloud-Based Facial Recognition Services), Technology, Use Case, and Application Area—Global Forecast to 2021," http://www.marketsandmarkets.com/Market-Reports/facial-recognition-market-995.html, Published on Nov. 16, 2017, Report Code: TC 3421, Printed on May 12, 2017, pp. 1-4.

* cited by examiner

PROFILE PICTURE MANAGEMENT TOOL ON SOCIAL MEDIA PLATFORM

BACKGROUND

Embodiments of the invention generally relate to electronic social media platforms, and more particularly to dynamic profile picture management.

A social network or social media platform is a social structure made up of individuals (or organizations) called "nodes" which are tied (connected) by one or more specific types of interdependency, such as friendship, kinship, common interest, financial exchange, workplace relationships, dislike, beliefs or knowledge. In its simplest form, a social network is a map of specified ties, such as friendship, between the nodes being studied. The nodes to which an individual is thus connected are the social contacts of that individual.

Examples of computer implemented social networks include FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), INSTAGRAM® (Instagram is a registered trademark of Instagram, LLC), or Tumblr® (Tumblr is a registered trademark of Tumblr Inc.), Snapchat® (Snapchat is a registered trademark of Snapchat Inc.), WhatsApp® (WhatsApp is a registered trademark of WhatsApp Inc.). Computer implemented social networks incorporate messaging systems that are capable of receiving and transmitting messages to client computers (e.g., mobile devices) of participant users of the messaging systems. Messaging systems can also be incorporated in systems that have minimal or no social network attributes. A messaging system can be provided by a short message system (SMS) text message delivery service of a mobile phone cellular network provider, or an email delivery system.

Modern social media networks or platforms generally allow users to have associated profile pictures. A user's profile picture is a digital image associated with the user. The profile picture may depict the user herself, or any other subject.

The profile picture is often displayed to the user and other social media users in various contexts. For example, the profile picture is displayed on the user's profile; other users visiting the user's profile web page can see the image. The profile picture is typically also displayed together with social media posts, comments, reactions, and other interactions that the user has with social media content. The profile picture also serves as a means to identify the user in various social media contexts and can also be used to authenticate a user. Adding a picture to a profile or editing a profile picture in these social media tools is currently a manual operation where the user uploads pictures from a given source and adds them to the user's profile.

SUMMARY

Embodiments of the invention provide for changing a profile picture of a user of a social network platform. In some embodiments, the change matches the sentiment of the context in which the profile picture appears or is used. Embodiments of the invention may be embodied as methods, computer program products, and systems. Embodiments of the invention receive a user post for posting to the social network platform and perform analysis on electronic text associated with the user post to identify a post sentiment. Embodiments of the invention determine that the post sentiment differs from a sentiment associated with the profile picture, and identify a candidate replacement profile picture having an associated sentiment that matches the post sentiment more closely relative to the associated sentiment of the profile picture.

DETAILED DESCRIPTION

Social media content and profile pictures both can have associated features including tone, sentiment, or subject. This means that not every posting or profile picture is uniformly appropriate across all social media platforms. Similarly, not all such features (tone, sentiment, or subject) is uniformly appropriate for all postings or communications on a given social media platform.

For example, consider the scenario where a social media platform user wishes to send condolences to a recipient user via a social media communication (e.g., a posting on the recipient user's profile, direct messaging inbox, etc.). The communication is often accompanied by the user's profile picture. The user's profile picture may depict the user in a gleeful or silly manner; a sentiment that the user may generally wish to convey to other social media users in different contexts (such as discussions and communications). In the particular instance of sending a message of condolence to the recipient user, however, the user's profile picture may be inappropriate. That is, either or both of the user and the recipient user may believe that a silly profile picture is inappropriate at the time of the recipient user grieving for a loss.

The problem described above is inherently technical in nature. Humans may adapt their facial expressions, body language, tone of voice, or other characteristics, based on the circumstances, but a computer is not inherently context aware. Therefore, implementing a sentiment-aware social media platform is a technical challenge. Embodiments of the invention provide methods, computer program products, and systems that provide solutions to this and related problems. The solutions are tied to the specific technological field involved (i.e., embodiments of the invention are not general solutions to sentiment analysis, but are narrowly tailored to the problem of lack of context awareness in communicating text and graphics in an electronic communication on a social media platform). Additionally, embodiments of the invention are not directed to sentiment analysis, but rather to dynamic profile picture management on social media platforms. Therefore, the disclosed and claimed solutions significantly advance the art of computing technology.

Embodiments of the invention will now be described in connection with the figures.

Figure 1:
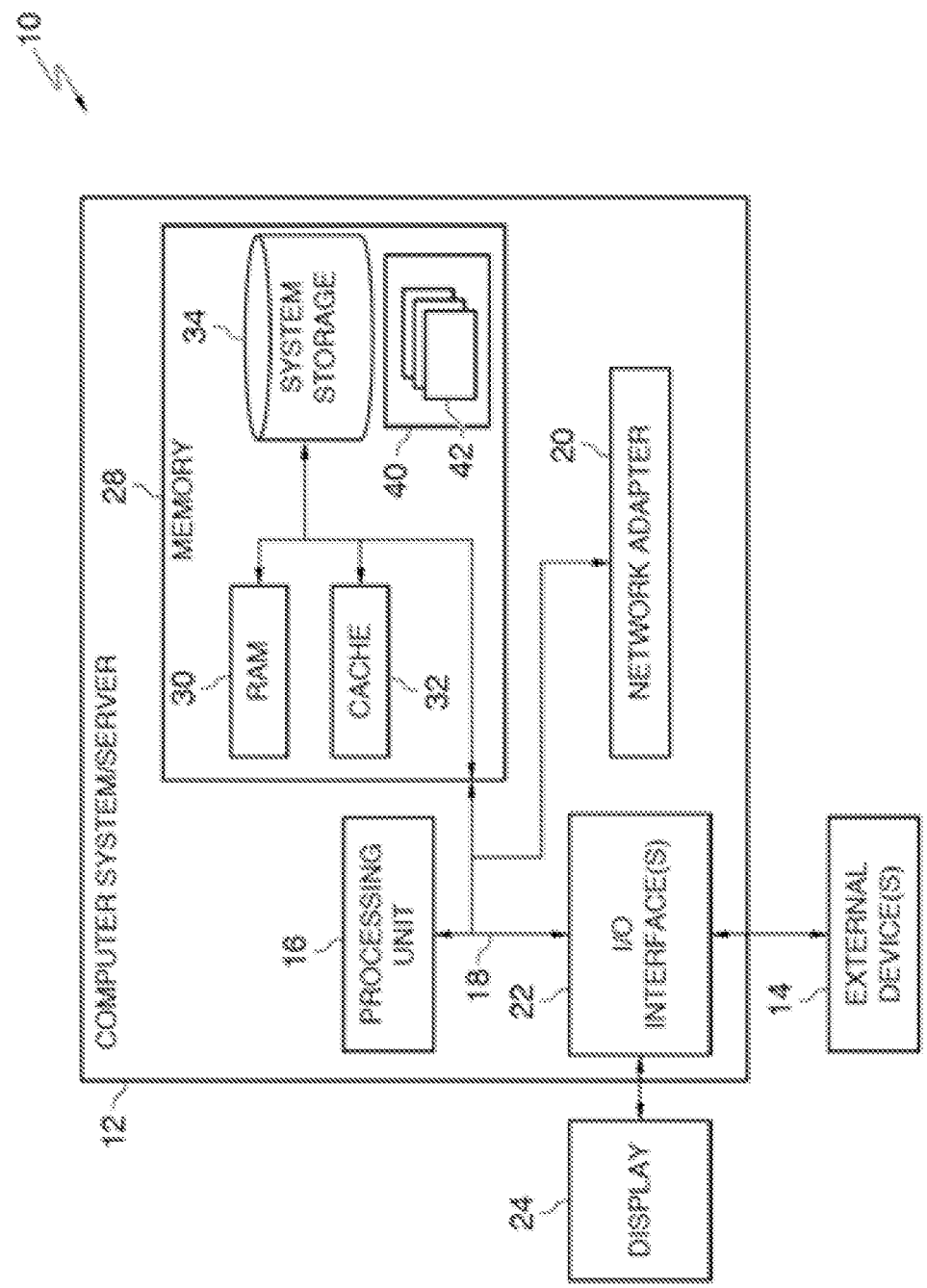
FIG. 1 is a block diagram of an illustrative computing node, according to an embodiment of the invention.

Referring now to FIG. 1, a schematic of an exemplary computing device (which may be a cloud computing node) is shown, according to an embodiment of the invention. Computing device 10 is only one example of a suitable cloud computing node and is not intended to suggest any limitation as to the scope of use or functionality of embodiments of the invention described herein.

In computing device 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing device 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
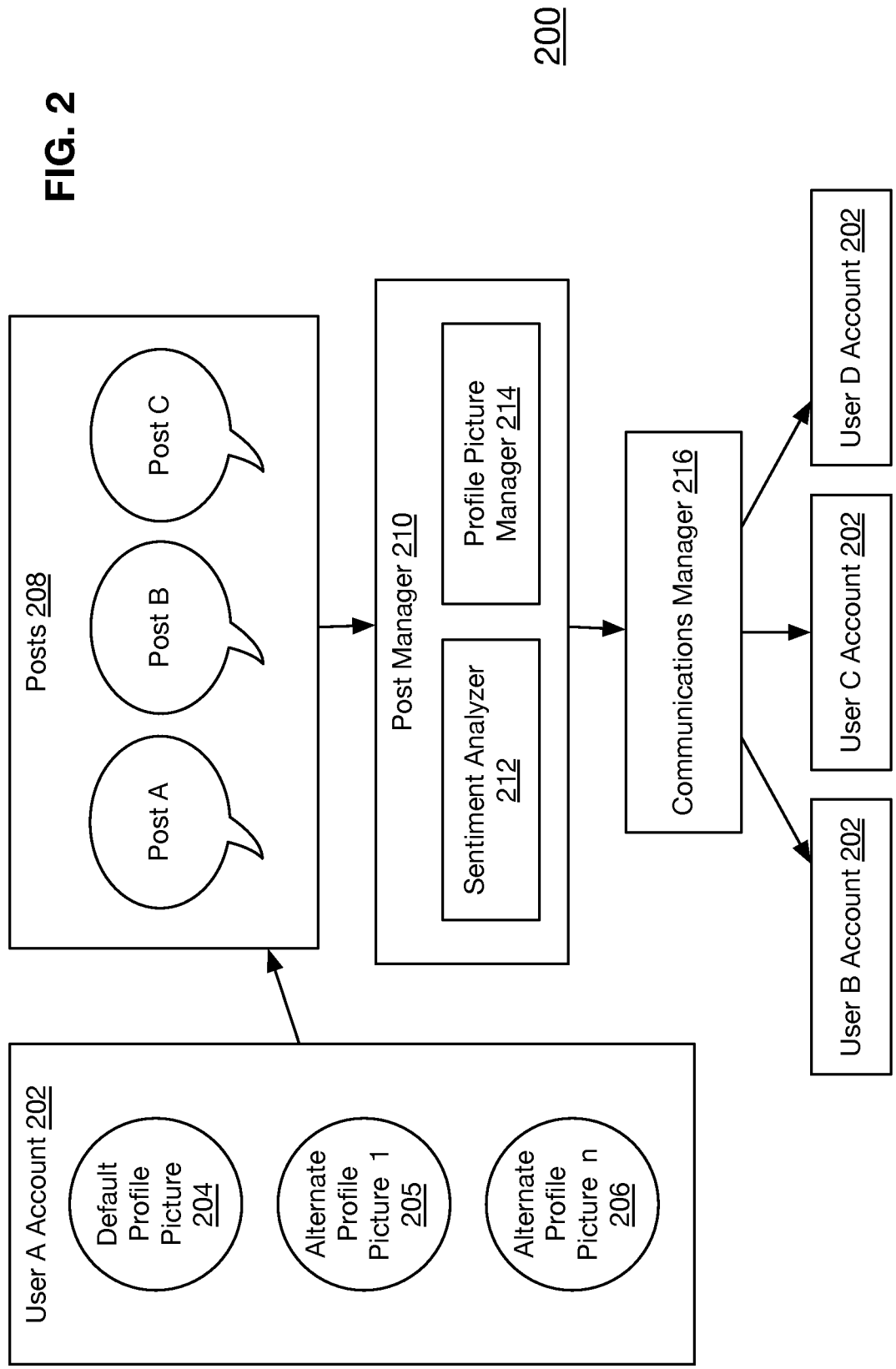
FIG. 2 is a block diagram of an illustrative social media platform, according to an embodiment of the invention.

Referring now to FIG. 2, a block diagram illustrating aspects of a social media platform 200 is provided. Social media platform 200 hosts one or more user accounts 202 (or nodes), for example User A, User B . . . User n. Each user account 202 may have a set of associated profile pictures, such as a default profile picture 204 and alternate profile pictures 1-n (labeled as alternate profile picture 1 205 and alternate profile picture n 206).

A profile picture of a given user account 202 is a digital image used in social media platform 200 to represent user account 202 graphically. For example, social media platform 200 displays User A's profile picture next to a message that User A sends to another user account 202, or next to an interaction that User A has with other content associated with another user account 202 (e.g., "likes").

User A may generate a variety of content on social media platform 200. For example, User A may post a status update, send a direct message to another user account 202, indicate a "like" (e.g., via a thumbs-up or heath interactive graphical element), share content from another user account 202 or another source, or otherwise communicate content to one or more other user accounts 202 on social media platform 200. These various interactions and content generation activities may collectively be referred to as social media posts, or simply, posts 208. User A may generate, for example, post A, post B, and post C. Each of these posts may be intended for communication to or observable by one or more other uses 202. For example, post A may be a direct message from User A to User B. Post 2 may be a status update by User A visible to User B and User C. Post C may be a status update visible to User B, User C, and User D.

Generally, "posting" to the social network platform includes communicating a direct message to another user account 202, "sharing" or "liking" a post by another user account 202, or otherwise interacting with content on the social media platform in a manner viewable by at least one other user account 202. A post is viewable if its content is generally capable of being viewed; it is not necessary that it in fact be viewable at a given time (for example, a post may be in draft mode otherwise have private settings; however, the post is viewable from a technical perspective).

Social media platform 200 may include a post manager 210 that generally receives posts from a user account 202, processes it, and delivers the post to one or more other user accounts 202 according to the post type and its sharing parameters (e.g., a direct message, a post restricted to friends, a public post, etc.). For example, post manager 210 receives posts 208 (post A, post B, post C) from User A. In an embodiment, post manager 210 processes these posts 208 prior to delivering them to their intended audiences. In another embodiment, the processing is performed at another time, at scheduled intervals, or from time to time.

The processing performed by post manager 210 may include performing sentiment or tone analysis of the post and related information via a sentiment analyzer 212 component. For example, where User A generates post A (direct message to User B), sentiment analyzer 212 performs sentiment or tone analysis on the message's text. In another example, where the post in question is a "like" of another user's status update, sentiment analyzer 212 analyzes the sentiment or tone of the status update.

According to an embodiment of the invention, sentiment analyzer 212 may generally function as follows. Sentiment analyzer 212 can perform, with respect to received content (such as a user post 208 or other content such as a receiving user's post whose post is being "liked") one or more of (a) topic classification; (b) sentiment classification; or (c) other NLP classifications. Sentiment analyzer 212 may perform natural language analysis, text analysis and/or computational linguistics to identify and extract subjective information in source materials.

Topic analysis for topic classification can include topic segmentation to identify several topics within the received content. Topic analysis can apply a variety of technologies e.g. one or more of hidden mark model (HMM), artificial chains, passage similarities using word co-occurrence, topic modeling, or clustering. Sentiment analysis for sentiment classification can determine the attitude of a speaker or a writer (i.e., user 202) with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader).

In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

In one embodiment, determining sentiment can include use of a scaling system whereby words commonly associated with having a negative, neutral or positive sentiment with them are given an associated number on a −10 to +10 scale (most negative up to most positive). Accordingly, it can be possible to adjust the sentiment of a given term relative to its environment (usually on the level of the sentence). When a piece of unstructured text is analyzed using natural language processing, each concept in the specified environment can be given a score based on the way sentiment words relate to the concept and its associated score. Accordingly, it can be possible to adjust the sentiment value of a concept relative to modifications that may surround it. Words, for example, that intensify, relax or negate the sentiment expressed by the concept can affect its score. Alternatively, text can be given a positive and negative sentiment strength score if the goal is to determine the sentiment in a text rather than the overall polarity and strength of the text.

Performing sentiment analyses can include use of knowledge based techniques, statistical methods, and/or hybrid approaches. Knowledge-based techniques classify text by affect categories based on the presence of unambiguous affect words such as "happy", "sad", "afraid", and "bored". Some knowledge bases not only list obvious affect words, but also assign arbitrary words a probable "affinity" to particular emotions.

Statistical methods can leverage elements from machine learning such as latent semantic analysis, support vector machines, "bag of words," semantic orientation, and pointwise mutual information. More sophisticated methods can detect the holder of a sentiment (i.e., the person who maintains that affective state) and the target (i.e., the entity about which the affect is felt). To mine the opinion in context and obtain the feature which has been opinionated, the grammatical relationships of words can be used. Grammatical dependency relations are obtained by deep parsing of the text. Hybrid approaches can leverage both machine learning and elements from knowledge representation such as ontologies and semantic networks in order to detect semantics that are expressed in a subtle manner, e.g., through the analysis of concepts that do not explicitly convey relevant information, but which are implicitly linked to other concepts that do explicitly convey relevant information.

Software tools can deploy machine learning, statistics, and natural language processing techniques. Knowledge-based systems can make use of publicly available resources, to extract the semantic and affective information associated with natural language concepts. Sentiment analysis can also be performed on visual or tactile content, i.e., images and videos.

In one embodiment, the Tone Analyzer™ service of IBM Watson® uses linguistic analysis to detect three types of tones from written text: sentiments, social tendencies, and writing style. Sentiments identified include "anger," "fear," "joy," "sadness," and "disgust." Identified social tendencies include Big Five personality traits used by some psychologists. These include "openness," "conscientiousness," "extraversion," "agreeableness," and "emotional range." Identified writing styles include "confident," "analytical," and "tentative." The Tone Analyzer™ service of IBM Watson® can process input JavaScript Object Notation (JSON) or plain text that contains textual based content into the service. The Tone Analyzer™ service of IBM Watson® can return tone analysis results in JSON that analyzes the tone for the input textual based content.

For example, one or more sentiment parameters can include e.g. an "anger" sentiment parameter, a "disgust" sentiment parameter, a "fear" sentiment parameter, a "joy" sentiment parameter, and/or a "sadness" sentiment parameter. In one embodiment, a sentiment parameter can include a score on a scale of 0.00 to 1.00 that indicates the likelihood that the sentiment exists in the message. A score of 0.00 can indicate a 0% likelihood that the sentiment exists and the score of 1.00 can indicate a 100% likelihood that a sentiment exists.

Post manager 210 may also perform tone or sentiment analysis for the profile pictures of user account 202, via profile picture manager 214. Profile picture manager 214 may categorize the various profile pictures according to predetermined categories, or by performing emotional categorization using handcrafted rules, machine learning techniques (such as neural networks), or any known method in the art. The output of profile picture manager 214 may be a categorization of a picture (e.g. as "sad", "happy", etc., similar to sentiments determined for text) along with a score for how closely the image is believed to express that sentiment. Profile picture manager 214 may analyze user pictures under a variety of circumstances. For example, profile picture manager 214 may analyze a user's pictures as the user uploads them to social media platform 200 (e.g., via a browser); or profile picture manager 214 may analyze user pictures on a photo app; profile picture manager 214 may analyze pictures that are stored as profile pictures, but also may analyze other pictures of the user. Profile picture manager 214 may even suggest candidate profile pictures from among other pictures that initially are not classified as profile pictures. In various embodiments of the invention, profile picture manager 214 may analyze pictures as they are added, periodically, or as needed.

Post manager 210 generally matches posts to profile pictures by comparing their respective sentiments and matching them according to various criteria, as will be explained in connection with embodiments of the invention.

Post manager 210 provides its output (which includes a matching of a post 208 to a profile picture) to a communications manager 214 component of social media platform 200. Communications manager 216 communicates the post 208 to the intended user accounts 202, and causes the post 208 to appear, for each recipient user account 202, along with the appropriately linked profile picture of the sending user account 202.

Figure 3:
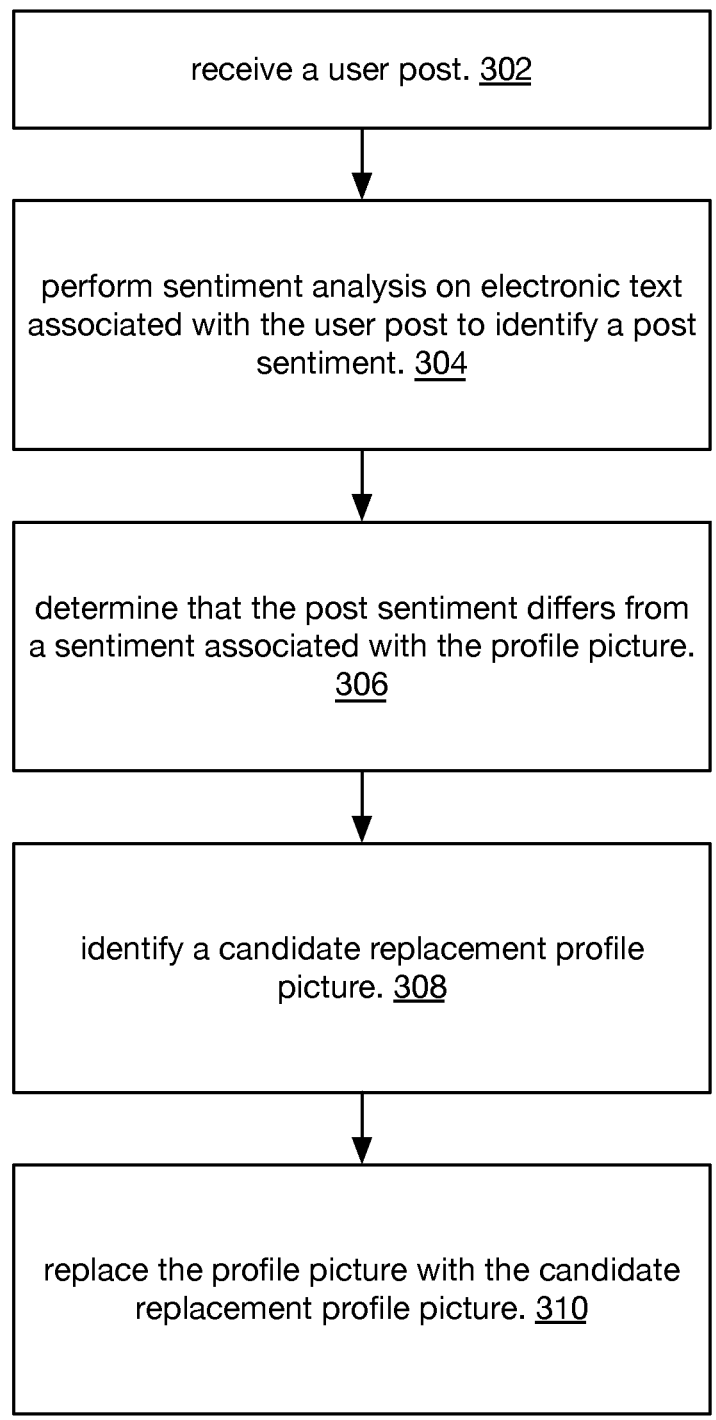
FIG. 3 is a flowchart of a method for managing a profile picture of a social media user, according to an embodiment of the invention.

Referring now to FIG. 3, an illustrative method 300 for managing a profile picture of a user of social network platform is provided. Method 300 illustrates a set of functions provided by executing programming instructions of a computer program running on one or more computer processors. For example, sentiment analyzer 212, profile picture manager 214, and communications manager 216 may provide these functions on social media platform 200 (FIG. 2).

Referring now to FIGS. 2 and 3, post manager 210 receives (step 302) a user post 208 from a user account 202 (for example, User A) for posting to the social network platform 200. Posting to the social network platform includes communicating a direct message to another user account 202, "sharing" or "liking" a post by another user account 202, or otherwise interacting with content on the social media platform in a manner viewable by at least one other user account 202.

Sentiment analyzer 212 of post manager 210 performs (step 304) sentiment analysis on electronic text associated with the user post 208 to identify a post sentiment. For example, if the user post 208 is a direct message to a recipient user account 202, the text associated with the user post 208 may be the message itself. If the user post 208 is a "like" of a status update of another user account 202, then the text associated with the user post 208 may be the text of the status update.

Post manager 210 determines (step 306) that the post 208 sentiment differs from a sentiment associated with the profile picture (for example, the default profile picture 204). Post manager 210 may do so by referencing previously determined or dynamically determined sentiments, by profile picture manager 214. Post manager 210 may compare the sentiments and determine if they defer. If the sentiments differ, post manager 210 may quantify the difference, for example, by measuring a difference in their respective scores. For example, if the post is determined to be "sad" with a score of 0.9 (90% confidence that the post expresses sadness) and the profile picture is determined to be "sad" with a score of 0.7 (70% confidence that the profile picture expresses sadness), then the two differ by a score of 0.2. The difference may be judged against a threshold value, such that a profile picture whose score differential exceeds the threshold value may be deemed inappropriate, and otherwise appropriate.

Post manager 210 identifies (step 308), via profile picture manager 214, a candidate replacement profile picture (for example, one of the alternate profile pictures 1-n) having an associated sentiment that matches the post sentiment more closely relative to the associated sentiment of the profile picture. For example, if the identified sentiment of post 208 is "sad", post manager 210 instructs profile picture manager 214 to identify an alternate profile picture that is also categorized as "sad". If the sentiment is quantified by a score, profile picture manager 214 may identify one or more alternate profile pictures that are tagged with the sentiment "sad" and a corresponding score that meets a threshold value.

Profile manager 214 may replace (step 310) a current profile picture 204 (which may be the default profile picture) with a particular alternate profile picture based on the identification (step 308). Replacing the current profile picture means linking a given post 208 with another profile picture, linking the user account 202 with another profile picture, or changing the default profile picture 204 with another profile picture. For example, based on a given post 208, profile manager 214 may change the current profile picture 204 for all new and/or past posts. This may be useful, for instance, if a given post 208 indicates that the user is generally grieving; the user's profile picture may be changed across the user's account and across the social media platform to reflect the user's current emotional state. As another example, based on a given post 208, profile manager 214 may change the current profile picture 204 selectively with respect to specific other user accounts or specific posts 208.

In one embodiment, profile manager 214 identifies (step 310 a set of additional candidate replacement profile pictures each having an associated sentiment that matches the post sentiment more closely relative to the associated sentiment of the profile picture. Profile manager 214 provides an option to the user (e.g., User A) to select from among the candidate profile picture and the set of additional candidate replacement profile pictures. Profile manager 214 receives a selection, from the user, of a replacement profile picture based on the provided option (the user's selection), and replaces the current profile picture 204 with the replacement profile picture.

In one embodiment, where the post 208 is a communication to a group of recipient users accounts 202, the replacement profile is visible to the group of recipient user accounts 202 but not to other users accounts 202.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for changing a default profile picture of a user of a social network platform, comprising:
    performing sentiment analysis on a set of profile pictures to identify, for each profile picture of the set of profile pictures, a sentiment expressed by a profile picture and a score on a scale from 0 to 1 for how closely the profile picture expresses the identified sentiment, wherein performing the sentiment analysis on the set of profile pictures further comprises categorizing each profile picture of the set according to predetermined categories, or by performing emotional categorization using handcrafted rules or a machine learning technique; and wherein the default profile picture of the user is part of the set of profile pictures;

receiving a user post for posting to the social network platform;

performing sentiment analysis on electronic text associated with the user post to identify a post sentiment, wherein the post sentiment comprises a sentiment parameter which includes a score on a scale from 0 to 1 that indicates the likelihood that the post sentiment exists in the electronic text;

determining that the post sentiment differs from a sentiment expressed by the default profile picture; and identifying, within the set of profile pictures, a candidate replacement profile picture expressing a sentiment that matches the post sentiment more closely relative to the expressed sentiment of the default profile picture, wherein matching the post sentiment is based on a context of the post, and wherein matching the post sentiment is based on a categorization of the candidate replacement profile picture, and wherein matching the post sentiment is based on a score for how closely the candidate replacement profile picture expresses its identified sentiment meeting a threshold value.

2. The method of claim 1, further comprising:
replacing the default profile picture with the candidate replacement profile picture.

3. The method of claim 1, further comprising:
identifying a set of additional candidate replacement profile pictures each having an associated sentiment that matches the post sentiment more closely relative to the associated sentiment of the default profile picture;
providing an option to the user to select from among the candidate replacement profile picture and the set of additional candidate replacement profile pictures;
receiving a selection, from the user, of a replacement profile picture based on the provided option; and
replacing the default profile picture with the replacement profile picture.

4. The method of claim 1, wherein replacing the default profile picture with the candidate replacement profile picture is selectively performed relative to two or more other users.

5. The method of claim 2, wherein the user post is a communication to a group of recipient users, wherein the candidate replacement profile picture is visible to the group of recipient users but not to other users.

6. The method of claim 1, wherein the user post is an interaction with another user's post.

7. The method of claim 6, wherein the interaction is any one of a "like" or "share".

8. A computer program product for changing a default profile picture of a user of a social network platform, the computer program product comprising a non-transitory tangible storage device having program code embodied therewith, the program code executable by a processor of a computer to perform a method, the code comprising code for:

performing, by the processor, sentiment analysis on a set of profile pictures to identify, for each profile picture of the set of profile pictures, a sentiment expressed by a profile picture and a score on a scale from 0 to 1 for how closely the profile picture expresses the identified sentiment, wherein performing the sentiment analysis on the set of profile pictures further comprises categorizing each profile picture of the set according to predetermined categories, or by performing emotional categorization using handcrafted rules or a machine learning technique; and wherein the default profile picture of the user is part of the set of profile pictures;

receiving, by the processor, a user post for posting to the social network platform;

performing, by the processor, sentiment analysis on electronic text associated with the user post to identify a post sentiment, wherein the post sentiment comprises a sentiment parameter which includes a score on a scale from 0 to 1 that indicates the likelihood that the post sentiment exists in the electronic text;

determining, by the processor, that the post sentiment differs from a sentiment expressed by the default profile picture; and identifying, by the processor, within the set of profile pictures, a candidate replacement profile picture expressing a sentiment that matches the post sentiment more closely relative to the expressed sentiment of the default profile picture, wherein matching the post sentiment is based on a context of the post, and wherein matching the post sentiment is based on a categorization of the candidate replacement profile picture, and wherein matching the post sentiment is based on a score for how closely the candidate replacement profile picture expresses its identified sentiment meeting a threshold value.

9. The computer program product of claim 8, further comprising code for:
replacing, by the processor, the default profile picture with the candidate replacement profile picture.

10. The computer program product of claim 8, further comprising code for:
identifying, by the processor, a set of additional candidate replacement profile pictures each having an associated sentiment that matches the post sentiment more closely relative to the associated sentiment of the default profile picture;
providing, by the processor, an option to the user to select from among the candidate replacement profile picture and the set of additional candidate replacement profile pictures;
receiving, by the processor, a selection, from the user, of a replacement profile picture based on the provided option; and
replacing, by the processor, the default profile picture with the replacement profile picture.

11. The computer program product of claim 8, wherein replacing the default profile picture with the candidate replacement profile picture is selectively performed relative to two or more other users.

12. The computer program product of claim 9, wherein the user post is a communication to a group of recipient users, wherein the candidate replacement profile picture is visible to the group of recipient users but not to other users.

13. The computer program product of claim 8, wherein the user post is an interaction with another user's post.

14. The computer program product of claim 13, wherein the interaction is any one of a "like" or "share".

15. A computer system for changing a default profile picture of a user of a social network platform, the computer system comprising:
one or more computer devices each having one or more processors and one or more tangible storage devices; and a program embodied on at least one of the one or more storage devices, the program having a plurality of program instructions for execution by the one or more processors, the program instructions comprising instructions for:

performing sentiment analysis on a set of profile pictures to identify, for each profile picture of the set of profile pictures, a sentiment expressed by a profile picture and a score on a scale from 0 to 1 for how closely the profile picture expresses the identified sentiment, wherein performing the sentiment analysis on the set of profile pictures further comprises categorizing each profile picture of the set according to predetermined categories, or by performing emotional categorization using handcrafted rules or a machine learning technique; and wherein the default profile picture of the user is part of the set of profile pictures;

receiving a user post for posting to the social network platform;

performing sentiment analysis on electronic text associated with the user post to identify a post sentiment, wherein the post sentiment comprises a sentiment parameter which includes a score on a scale from 0 to 1 that indicates the likelihood that the post sentiment exists in the electronic text;

determining that the post sentiment differs from a sentiment expressed by the default profile picture; and identifying, within the set of profile pictures, a candidate replacement profile picture expressing a sentiment that matches the post sentiment more closely relative to the expressed sentiment of the default profile picture, wherein matching the post sentiment is based on a context of the post, and wherein matching the post sentiment is based on a categorization of the candidate replacement profile picture, and wherein matching the post sentiment is based on a score for how closely the candidate replacement profile picture expresses its identified sentiment meeting a threshold value.

16. The computer system of claim 15, further comprising:
replacing the default profile picture with the candidate replacement profile picture.

17. The computer system of claim 15, further comprising:
identifying a set of additional candidate replacement profile pictures each having an associated sentiment that matches the post sentiment more closely relative to the associated sentiment of the default profile picture;
providing an option to the user to select from among the candidate replacement profile picture and the set of additional candidate replacement profile pictures;
receiving a selection, from the user, of a replacement profile picture based on the provided option; and
replacing the default profile picture with the replacement profile picture.

18. The computer system of claim 15, wherein replacing the default profile picture with the candidate replacement profile picture is selectively performed relative to two or more other users.

19. The computer system of claim 16, wherein the user post is a communication to a group of recipient users, wherein the candidate replacement profile picture is visible to the group of recipient users but not to other users.

20. The computer system of claim 15, wherein the user post is an interaction with another user's post.

* * * * *